US012134995B2

(12) United States Patent
Tan et al.

(10) Patent No.: US 12,134,995 B2
(45) Date of Patent: Nov. 5, 2024

(54) METHOD FOR CONTROLLING COMBUSTION SYSTEM, COMBUSTION SYSTEM, AND INTERNAL COMBUSTION ENGINE

(71) Applicant: WEICHAI POWER CO., LTD, Shandong (CN)

(72) Inventors: Xuguang Tan, Shandong (CN); Dehui Tong, Shandong (CN); Peng Zhou, Shandong (CN); Xiaoxin Liu, Shandong (CN); Bin Pang, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/276,926

(22) PCT Filed: Dec. 13, 2021

(86) PCT No.: PCT/CN2021/137391
§ 371 (c)(1),
(2) Date: Aug. 11, 2023

(87) PCT Pub. No.: WO2022/262218
PCT Pub. Date: Dec. 22, 2022

(65) Prior Publication Data

US 2024/0117780 A1 Apr. 11, 2024

(30) Foreign Application Priority Data

Jun. 17, 2021 (CN) ......................... 202110669921.7

(51) Int. Cl.
*F02D 41/40* (2006.01)
*F02D 41/24* (2006.01)
*F02D 41/38* (2006.01)

(52) U.S. Cl.
CPC ....... *F02D 41/402* (2013.01); *F02D 41/2432* (2013.01); *F02D 41/2467* (2013.01);
(Continued)

(58) Field of Classification Search
CPC ............... F02D 41/402; F02D 41/2432; F02D 41/2467; F02D 41/3836; F02D 2041/389; F02D 2200/024
See application file for complete search history.

(56) References Cited

U.S. PATENT DOCUMENTS 6,491,016 B1 12/2002 Buratti
2002/0078918 A1* 6/2002 Ancimer .................. F02B 7/08
123/304

(Continued)

FOREIGN PATENT DOCUMENTS

CN 102312739 A 1/2012
CN 106414974 A 2/2017

(Continued)

OTHER PUBLICATIONS

International Search Report for International Application No. PCT/CN2021/137391; Mailing Date, Mar. 15, 2022.

(Continued)

*Primary Examiner* — Joseph J Dallo
(74) *Attorney, Agent, or Firm* — CANTOR COLBURN LLP

(57) ABSTRACT

A combustion system may include a piston, a fuel injector, and a cylinder. At a main fuel injection stage, the fuel injector injects a main fuel into the cylinder in sequence to drive the piston to work. A method for controlling the combustion system includes controlling the fuel injector to execute a first-stage main fuel injection in a compression stroke, the first-stage main fuel injection includes at least one injection, and continues till a power stroke such that the (Continued)

cylinder pressure in the cylinder reaches a target pressure peak value; and before the cylinder pressure in the cylinder reaches a descending critical point, executing a second-stage main fuel injection, the second-stage main fuel injection includes at least one injection, and the fuel injected in the second-stage main fuel injection and the fuel injected in the first-stage main fuel injection are superimposed.

11 Claims, 3 Drawing Sheets

(52) U.S. Cl.
CPC .... *F02D 41/3836* (2013.01); *F02D 2041/389* (2013.01); *F02D 2200/024* (2013.01)

(56) References Cited

U.S. PATENT DOCUMENTS

| | | | | |
|---|---|---|---|---|
| 2011/0276255 | A1* | 11/2011 | Haskara | F02D 35/023 123/295 |
| 2012/0000197 | A1 | 1/2012 | Maruyama et al. | |
| 2012/0191325 | A1* | 7/2012 | Haskara | F02D 41/402 123/299 |
| 2017/0130667 | A1 | 5/2017 | Uehara | |
| 2017/0191442 | A1* | 7/2017 | Polonowski | F02D 41/064 |
| 2017/0241368 | A1* | 8/2017 | Anders | F02B 23/0669 |
| 2017/0342916 | A1 | 11/2017 | Jung et al. | |
| 2018/0328307 | A1* | 11/2018 | Kurtz | F02D 41/403 |
| 2018/0347476 | A1* | 12/2018 | Idicheria | H05H 1/46 |
| 2019/0301391 | A1* | 10/2019 | Shimizu | F02D 41/3035 |
| 2019/0309702 | A1* | 10/2019 | Kato | F02D 35/028 |
| 2019/0331041 | A1* | 10/2019 | Kuzuyama | F02D 41/068 |
| 2020/0003145 | A1* | 1/2020 | Sugano | F02D 35/028 |
| 2020/0108815 | A1* | 4/2020 | Nakamura | F02D 41/403 |
| 2020/0271068 | A1* | 8/2020 | Dodis | F02D 19/0642 |

FOREIGN PATENT DOCUMENTS

| | | | | | |
|---|---|---|---|---|---|
| CN | 107420212 | A | | 12/2017 | |
| CN | 110360019 | A | | 10/2019 | |
| CN | 113123891 | A | | 7/2021 | |
| EP | 1122417 | A2 | | 8/2001 | |
| EP | 2551500 | A1 | | 1/2013 | |
| JP | 2001214782 | A | | 8/2001 | |
| JP | 2003262146 | A | | 9/2003 | |
| JP | 2004100557 | A | | 4/2004 | |
| JP | 2011089445 | A | | 5/2011 | |
| JP | 2011202630 | A | | 10/2011 | |
| JP | 2017057758 | A | | 3/2017 | |
| JP | 2017096245 | A | | 6/2017 | |
| JP | 2020007954 | A | * | 1/2020 | F02B 23/0678 |
| WO | WO-0159285 | A2 | * | 8/2001 | F02B 1/12 |
| WO | WO-0220956 | A1 | * | 3/2002 | F02B 3/10 |
| WO | 2012046311 | A1 | | 4/2012 | |
| WO | WO-2017095411 | A1 | * | 6/2017 | F02D 13/02 |

OTHER PUBLICATIONS

JPO Notice of Reasons for Refusal for corresponding JP Application No. 2023-552502; Issued May 14, 2024.

* cited by examiner

METHOD FOR CONTROLLING COMBUSTION SYSTEM, COMBUSTION SYSTEM, AND INTERNAL COMBUSTION ENGINE

CROSS REFERENCE TO RELATED APPLICATIONS

This is the U.S. national stage of application No. PCT/CN2021/137391, filed on Dec. 13, 2021. Priority under 35 U.S.C. § 119(a) and 35 U.S.C. § 365(b) is claimed from Chinese Application No. 202110669921.7, filed Jun. 17, 2021, the disclosure of which is also incorporated herein by reference.

FIELD

The present application relates to the technical field of internal combustion engines, and in particular to a method for controlling a combustion system, a combustion system, and an internal combustion engine.

BACKGROUND

The traditional high pressure common rail technology can realize multiple injections, which includes a main fuel injection (more than 80% of the fuel is injected) in an intermediate moment, and several small injections (injection quantity accounts for about 10% to 20%) before and after the main fuel injection, so as to reduce combustion noise (pre-injection, i.e., injection before the main fuel injection) or improve smoke emission and exhaust-temperature thermal management (post-injection, i.e. injection after the main fuel injection).

In order to further improve the performance of internal combustion engines, it is proposed in the conventional technology to divide the main fuel injection into multiple injections and perform two or more main fuel injections. A peak cylinder pressure can be reduced by delaying the combustion phase. The peak cylinder pressure can be maintained within a limited range to maintain cylinder integrity. However, delaying the combustion phase can leads to high fuel consumption and high exhaust temperature, which further limits the torque and the output power of the internal combustion engine. Therefore, it is proposed to divide the main fuel injection into at least two injections, a first injection starts earlier than a start time of an originally planned main fuel injection, and a second injection starts at or later than the start time of the originally planned main fuel injection, which can advance the combustion phase or reduce the required delay of the combustion phase, maintain the cylinder pressure within the maximum pressure value, and realize the maximum torque and maintain the exhaust temperature below the maximum exhaust temperature.

The main goal of dividing the main fuel injection into multiple injections as described above is to generate a relatively high torque output without increasing exhaust temperature by dividing the main fuel injection when the cylinder pressure peak value is reached or exceeded. However, for the method of dividing the main fuel injection into multiple injections, an interval between the first injection and the second injection is too long, resulting in almost no spatial superposition effect of entrainment effects, low air utilization rate, low thermal efficiency, and high fuel consumption of the internal combustion engine.

SUMMARY

The present application is to provide a method for controlling a combustion system, a combustion system, and an internal combustion engine. The method for controlling a combustion system fully utilizes spatial superposition effect of entrainment effects of high-speed oil beams of the main fuel injected in succession, increasing the oil gas mixing rate in the cylinder, effectively improving the combustion speed and the air utilization rate in the cylinder in the middle and later combustion stages, so that the combustion efficiency of the combustion system is high, and the fuel consumption of the internal combustion engine is low.

The present application provides the following technical solutions.

A method for controlling a combustion system, specifically, the combustion system includes a piston, a fuel injector and a cylinder, the fuel injector injects a main fuel into the cylinder in succession in a main fuel injection stage to drive the piston to work, the method for controlling a combustion system includes:

controlling the fuel injector to

- execute a first-stage main fuel injection in a compression stroke, the first-stage main fuel injection includes at least one injection and lasts until a power stroke, and a cylinder pressure in the cylinder is allowed to reach a target pressure peak value; and
- execute a second-stage main fuel injection before the cylinder pressure in the cylinder is at a descending critical point, the second-stage main fuel injection includes at least one injection, fuel injected in the second-stage main fuel injection and fuel injected in the first-stage main fuel injection are superimposed, and the cylinder pressure in the cylinder is allowed to be maintained at the target pressure peak value for a predetermined time.

As a preferred embodiment of the method for controlling a combustion system, in a case that a difference presents between the cylinder pressure in the cylinder during the first-stage main fuel injection and the target pressure peak value, a fuel rail pressure is adjusted and/or an interval time between the second-stage main fuel injection and the first-stage main fuel injection is adjusted to allow the cylinder pressure in the cylinder to be equal to the target pressure peak value.

As a preferred embodiment of the method for controlling a combustion system, in a case that the difference between the cylinder pressure in the cylinder during the first-stage main fuel injection and the target pressure peak value is less than or equal to 5%, the fuel rail pressure to allow the cylinder pressure in the cylinder to reach the target pressure peak value is adjusted; in a case that the difference between the cylinder pressure in the cylinder during the first-stage main fuel injection and the target pressure peak value is greater than 5%, the fuel rail pressure is adjusted and the interval time between the second-stage main fuel injection and the first-stage main fuel injection is adjusted to allow the cylinder pressure in the cylinder to reach the target pressure peak value, or the interval time between the second-stage main fuel injection and the first-stage main fuel injection is adjusted to allow the cylinder pressure in the cylinder to reach the target pressure peak value.

As a preferred embodiment of the method for controlling a combustion system, the interval time between the second-stage main fuel injection and the first-stage main fuel injection is 300 μs to 1200 μs.

As a preferred embodiment of the method for controlling a combustion system, a calibration parameter of a single main fuel injection is a parameter of the single main fuel injection calibrated when fuel consumption of an internal combustion engine is minimized and nitrogen oxide emission of the internal combustion engine is minimized under a condition of meeting an emission requirement of nitrogen oxides, and the calibration parameter of the single main fuel injection includes a calibration injection quantity of the single main fuel injection, and total injection quantity of the first-stage main fuel injection and the second-stage main fuel injection is equal to the calibration injection quantity of the single main fuel injection, assuming that an injection quantity of the first-stage main fuel injection is Q1 and an injection quantity of the second-stage main fuel injection is Q2, Q2 is equal to 0.05Q1 to 0.5Q1.

As a preferred embodiment of the method for controlling a combustion system, a duration of the first-stage main fuel injection is determined according to the injection quantity of the first-stage main fuel injection and an injection pressure of the first-stage main fuel injection, and a duration of the second-stage main fuel injection is determined according to the injection quantity of the second-stage main fuel injection and an injection pressure of the second-stage main fuel injection.

As a preferred embodiment of the method for controlling a combustion system, the calibration parameter of the single main fuel injection further includes a calibration injection pressure of the single main fuel injection, the injection pressure of the first-stage main fuel injection is greater than the calibration injection pressure of the single main fuel injection, and the injection pressure of the second-stage main fuel injection is greater than or equal to the injection pressure of the first-stage main fuel injection.

As a preferred embodiment of the method for controlling a combustion system, the duration of the first-stage main fuel injection and the duration of the second-stage main fuel injection are both in a range of 100 μs to 1500 μs.

As a preferred embodiment of the method for controlling a combustion system, the duration of the first-stage main fuel injection is within a range from a crank angle of 25° before a top dead center to the crank angle of 20° after a top dead center.

As a preferred embodiment of the method for controlling a combustion system, the predetermined time is 50% to 100% of the duration of the first-stage main fuel injection.

A combustion system uses the method for controlling the combustion system described above, a pressure sensor is arranged in the cylinder, and the pressure sensor is configured to detect the cylinder pressure in the cylinder.

An internal combustion engine includes the combustion system described above.

The beneficial effects of the present application are as follows.

The method for controlling a combustion system provided according to the present application involves controlling the fuel injector to execute the first-stage main fuel injection in the compression stroke. The first-stage main fuel injection includes at least one injection and lasts until the power stroke, so that the cylinder pressure in the cylinder reaches the target pressure peak value. The second-stage main fuel injection is executed before the cylinder pressure in the cylinder reaches the descending critical point. The second-stage main fuel injection includes at least one injection, the fuel injected in the second-stage main fuel injection and the fuel injected in the first-stage main fuel injection are superimposed, so that the cylinder pressure in the cylinder is maintained at the target pressure peak value for the predetermined time. The method for controlling a combustion system provided according to the present application establishes the target pressure peak value in the cylinder through the first-stage main fuel injection. The second-stage main fuel injection is executed before the cylinder pressure in the cylinder reaches the descending critical point, which can promote the superposition of entrainment effects, further increase the mixing area of fuel and air, improve the air utilization rate in the cylinder, thereby improve the combustion speed of the middle and later stages in the cylinder, and promote rapid fuel combustion, so that the heat release during the combustion process is always maintained at a relatively high value, and the pressure in the cylinder remains constant.

The combustion system provided according to the present application using the method for controlling a combustion system described above, fully utilizes the spatial superposition strength of entrainment effects of high-speed oil beams of the first-stage main fuel injection and the second-stage main fuel injection, realizing secondary organization of the oil beams to the flow field in the cylinder, enhancing the turbulence in the cylinder to the greatest extent, improving the oil gas mixing rate in the cylinder, and effectively improving the combustion speed and the air utilization rate in the cylinder in the middle and later combustion stages, so as to improve the combustion efficiency of the combustion system.

The internal combustion engine provided according to the present application adopts the combustion system described above to avoid excessive concentration of fuel at one time. The spatial superposition of the entrainment effects generated in the first-stage main fuel injection and the second-stage main fuel injection is utilized, so that the combustion efficiency is improved, the fuel consumption is reduced, and the economy of the internal combustion engine is improved.

DETAILED DESCRIPTION OF EMBODIMENTS

Figure 1:
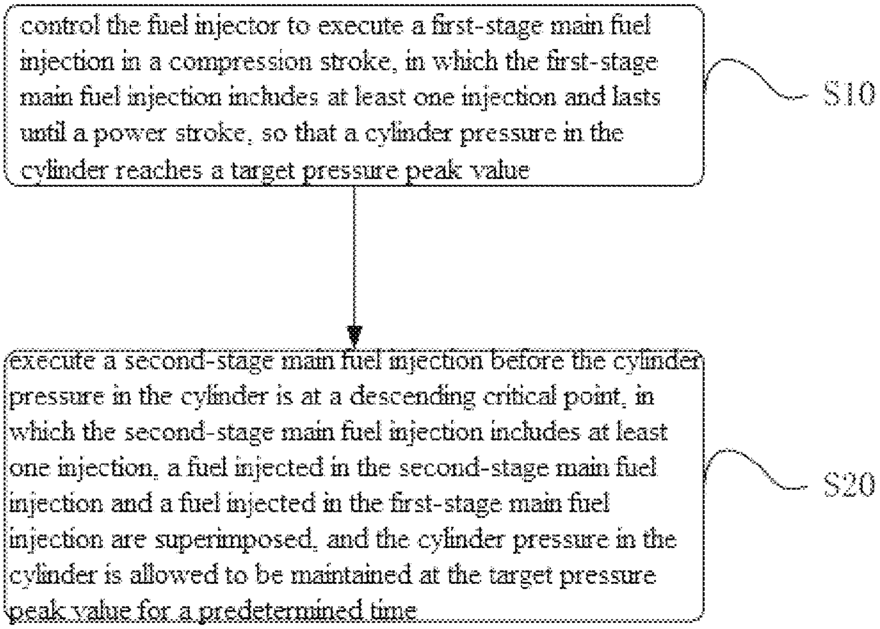
FIG. 1 is a flow chart of a method for controlling a combustion system provided according to Embodiment 2 of the present application.

The embodiments of the present application are described in detail below, examples of the embodiments are shown in the accompanying drawings, and same or similar reference signs represent same or similar elements or elements with same or similar functions throughout. The embodiments described below by referring to the accompanying drawings are exemplary, and are intended to explain the present application, and should not be understood as limitations to the present application.

In the description of the present application, it should be noted that, orientations or positional relationships indicated by terms such as “center”, “up”, “down”, “left”, “right”, “vertical”, “horizontal”, “inside” and “outside” are based on the orientations or position relationships shown in the accompanying drawings, and are only for the convenience of describing the present application and simplifying the description, rather than indicating or implying that devices or elements referred to must have specific orientations, or must be constructed and operated in specific orientations, and thus should not be understood as limitations to the present application. In addition, terms “first” and “second” are only used for description and should not be understood as indicating or implying relative importance. The terms “first position” and “second position” represent two different positions.

Unless otherwise clearly specified and limited, terms “install”, “connect to”, “connect” and “fix” should be understood in a broad sense, for example, may be a fixed connection, a detachable connection; may be a mechanical connection or an electric connection; may be a direct connection, or an indirect connection through an intermediary, and may be an internal connection of two elements or an interaction relationship between two elements. For those skilled in the art, the specific meanings of the terms in the present application can be understood according to specific situations.

Unless otherwise clearly specified and limited, a first feature being “on” or “under” a second feature may include the first feature directly contacting the second feature and may also include the first feature not directly contacting the second feature but contacting through another feature between the first and second features. Moreover, the first feature being “on”, “above” and “over” the second feature includes that the first feature is directly above and obliquely above the second feature, or simply indicate that the first feature is horizontally higher than the second feature. The first feature being “below”, “under” and “beneath” the second feature includes that the first feature is directly below and obliquely below the second feature, or simply indicate that the first feature is horizontally lower than the second feature.

The technical solutions of the present application are further described below in conjunction with the accompanying drawings and through the embodiments.

Embodiment 1

An internal combustion engine is provided according to the embodiment. The internal combustion engine includes a combustion system. Fuel and air are mixed in the combustion system for being burned in a cylinder, and heat energy is released to generate high-temperature and high-pressure gas in the cylinder. The gas expands to push a piston to do work, and then mechanical work is output through the crank connecting rod mechanism or other mechanisms to drive a driven machine to work.

The combustion system used in the internal combustion engine according to the embodiment avoids excessive concentration of fuel at one time and utilizes the spatial superposition of entrainment effects generated between a first-stage main fuel injection and a second-stage main fuel injection to improve combustion efficiency, reduce fuel consumption, and improve the economy of the internal combustion engine.

A combustion system is further provided according to the embodiment, which includes a piston, an injector, a cylinder, and a cylinder head. The piston, the cylinder, the cylinder head and so on together form a combustion chamber, and the injector is arranged on the cylinder head. The fuel is delivered into the cylinder by the injector through multiple main fuel injections. The fuel is burned in the combustion chamber, and the piston suffers force of the fuel and transmits power to the crankshaft through a piston pin and a connecting rod, so as to complete a working process of the internal combustion engine. In the embodiment, the fuel is fuel oil, and the fuel oil includes gasoline, biodiesel, or mixed fuels (for example, gasoline and ethanol, or gasoline and methanol). The piston is a w-type piston, multiple sections of arc ridges are arranged outside a throat of the w-type piston, and the throat is arranged between a concavity of the w-type piston and the multiple sections of arc ridges. The w-type piston, the cylinder and the cylinder head together form a w-type combustion chamber. During the fuel injection, the fuel oil hits the throat, and then is injected into the concavity and the multiple sections of arc ridges, the superposition of the entrainment effects is enhanced.

The entire working process of the internal combustion engine includes an intake stroke, a compression stroke, a power stroke, and an exhaust stroke. The crankshaft is configured to drive the piston to move from a top dead center to a bottom dead center. When an intake valve is opened, the mixture of fuel and air is sucked into the cylinder, and the intake stroke ends when the piston reaches the bottom dead center. After the intake stroke ends, the piston has reached the bottom dead center, and at this moment the cylinder is filled with the mixture of fuel and air. The crankshaft continues to drive the piston to move from the bottom dead center to the top dead center, the intake valve and an exhaust valve are closed, the mixture is compressed, the pressure and temperature rise, and the compression stroke does not end until the piston reaches the top dead center. At a certain moment before the piston reaches the top dead center, high-voltage electricity provided by an ignition system acts on a spark plug, and the spark plug flashes to ignite the mixture in the cylinder. Since the piston runs extremely fast and quickly crosses the top dead center, and the mixture is rapidly burned and expands to do work, the piston is pushed downward to drive the crankshaft to output power, and the power stroke ends when the piston reaches the bottom dead center. After the power stroke ends, the piston reaches the bottom dead center, and the crankshaft drives the piston to move from the bottom dead center to the top dead center. At this time, the exhaust valve is required to be opened, and the burned exhaust gas is discharged through the exhaust valve. The exhaust stroke ends, the piston is at the top dead center, and a next intake stroke begins. The completion of the intake stroke, the compression stroke, the power stroke, and the exhaust stroke is called a work cycle, and the crankshaft is turned two times to complete the work cycle.

In the combustion system according to the embodiment, a pressure sensor is also arranged in the cylinder, and the pressure sensor is configured to detect a cylinder pressure in the cylinder. In the first-stage main fuel injection, whether to enter the second-stage main fuel injection is determined according to the cylinder pressure in the cylinder, so as to maintain the cylinder pressure within the target pressure peak value and maintain exhaust temperature below a highest exhaust temperature while a maximum torque is achieved.

In the embodiment, the combustion system further includes a controller, a crank angle sensor, and a temperature sensor. The injection of the fuel injector is controlled by a solenoid valve. When the solenoid valve is powered on, the fuel injector starts to inject. When the solenoid valve is powered off, the fuel injector stops injecting. The controller is electrically connected to the solenoid valve, the crank angle sensor, the temperature sensor, and the pressure sensor. The controller controls the fuel injector to start injecting by controlling the solenoid valve to be powered on and controls the fuel injector to stop injecting by controlling the solenoid valve to be powered off. The crank angle sensor is configured to detect crank angles when the solenoid valve is powered on and powered off and send the crank angles to the controller. The temperature sensor is configured to detect temperature in the cylinder. The controller stores the highest exhaust temperature, and the temperature sensor sends the detected temperature in the cylinder to the controller. The controller compares the received temperature in the cylinder with the highest exhaust temperature, and controls fuel injection through a comparison result and a setup program stored in the controller. The pressure sensor sends the detected cylinder pressure to the controller, and the controller stores the target pressure peak value. The controller compares the received cylinder pressure with the target pressure peak value and adjusts fuel rail pressure and/or an interval time between the first-stage main fuel injection and the second-stage main fuel injection based on a comparison result, so as to allow the cylinder pressure in the cylinder to reach the target pressure peak value.

It should be noted that, electrical connection modes between the controller and the solenoid valve, and the controller and the sensors, and working principles thereof are the conventional technologies, and are not be repeated here.

The combustion system according to the embodiment fully utilizes the spatial superposition strength of entrainment effects of high-speed oil beams of the first-stage main fuel injection and the second-stage main fuel injection, realizing secondary organization of the oil beams to the flow field in the cylinder, enhancing the turbulence in the cylinder to the greatest extent, improving the oil gas mixing rate in the cylinder, and effectively improving the combustion speed and air utilization rate in the cylinder in the middle and later combustion stages, so as to improve the combustion efficiency of the combustion system.

Embodiment 2

As shown in FIG. 1, a method for controlling a combustion system is provided according to the embodiment. The method for controlling a combustion system includes the following steps S10 to S20.

In step S10, the fuel injector is controlled to execute a first-stage main fuel injection in a compression stroke. The first-stage main fuel injection includes at least one injection and lasts until a power stroke, so that a cylinder pressure in the cylinder reaches a target pressure peak value.

Figure 2:
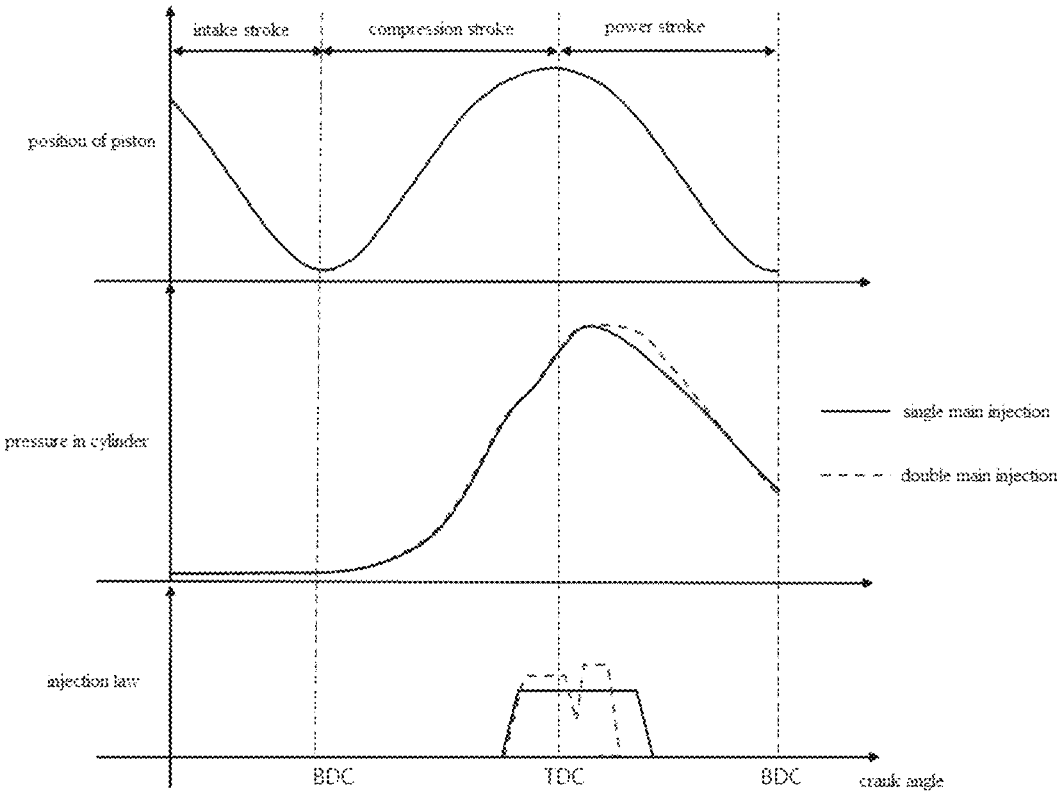
FIG. 2 is a schematic diagram of relationships between crank angles and positions of a piston, crank angles and pressures in a cylinder, crank angles and injection law of a first-stage main fuel injection and a second-stage main fuel injection provided according to Embodiment 2 of the present application.

As a preferred embodiment of the method for controlling a combustion system, as shown in FIG. 2, the first-stage main fuel injection includes one injection, and the injection lasts from the compression stroke of a piston to the power stroke of the piston, establishing the target pressure peak value in the cylinder. It should be noted that, in FIG. 2, a single main injection refers to a single main fuel injection, a double main injection refers to the first-stage main fuel injection and the second-stage main fuel injection, TDC refers to a top dead center of a crankshaft movement, and BDC refers to a bottom dead center of the crankshaft movement.

In the embodiment, by controlling a start time, a duration and an injection pressure of the first-stage main fuel injection, the fuel injected in the first-stage main fuel injection is burned in a combustion chamber, and the cylinder pressure in the cylinder reaches the target pressure peak value to drive the piston to do work. In other embodiments, the first-stage main fuel injection may also be performed through multiple injections to allow the cylinder pressure in the cylinder to reach the target pressure peak value. It should be noted that the peak target pressure peak value is less than the maximum pressure that the cylinder can withstand.

The cylinder pressure in the cylinder is detected by a pressure sensor, and the pressure sensor sends the detected cylinder pressure to the controller. The controller compares the received cylinder pressure in the cylinder with the target pressure peak value and adjusts parameters according to the comparison results to allow the cylinder pressure in the cylinder to reach the target pressure peak value.

In step S20, a second-stage main fuel injection is executed before the cylinder pressure in the cylinder is at a descending critical point. The second-stage main fuel injection includes at least one injection, and a fuel injected in the second-stage main fuel injection and a fuel injected in the first-stage main fuel injection are superimposed, so that the cylinder pressure in the cylinder is maintained at the target pressure peak value for a predetermined time.

As a preferred embodiment of the method for controlling a combustion system, as shown in FIG. 2, the second-stage main fuel injection also includes one injection, and the second-stage main fuel injection is executed before the cylinder pressure is at the descending critical point. In other embodiments, the second-stage main fuel injection may also be performed through multiple injections to allow the cylinder pressure in the cylinder to be maintained at the target pressure peak value for the predetermined time.

It should be noted that, during the first-stage main fuel injection, the solenoid valve of the fuel injector is controlled to be powered on, the timing when the fuel injector receives feedback to start injecting fuel is delayed compared to the timing when the solenoid valve is powered on; correspondingly, the solenoid valve of the fuel injector is controlled to be powered off, the timing when the fuel injector receives feedback to stop injecting fuel is also delayed compared to the timing when the solenoid valve is powered off, and a delay time is assumed to be T1. Similarly, during the second-stage main fuel injection, the timing when the fuel injector receives feedback to start injecting fuel is also delayed compared to the timing when the solenoid valve is powered on, and a delay time is assumed to be T2, and T1>T2. In order to maintain the cylinder pressure in the cylinder at the target pressure peak value for the predetermined time, it is required to ensure that the fuel injected into the combustion chamber is uninterrupted. Therefore, the interval time between the first-stage main fuel injection and the second-stage main fuel injection (i.e., the interval time between the timing when the solenoid valve is powered off during the first-stage main fuel injection and the timing when the solenoid valve is powered on during the second-stage main fuel injection) is T, and T≤T2−T1. In this way, momentum exchange can be ensured to exist between the fuels injected in the first-stage main fuel injection and the second-stage main fuel injection, so that the fuel injected in the first stage moves with the fuel injected in the second stage, and the entrainment effects are superimposed.

As a preferred embodiment of the method for controlling a combustion system, the interval time between the second-stage main fuel injection and the first-stage main fuel injection is 300 μs to 1200 μs. In the embodiment, the superposition effect of the entrainment effects is related to the interval time between two main fuel injections. If the interval time between two main fuel injections is too long, the spatial superposition effect of the entrainment effects is greatly weakened, the air utilization rate is low, and the fuel consumption is also increased. Therefore, the second-stage main fuel injection is required to be executed before the cylinder pressure in the cylinder is at the descending critical point, and the cylinder pressure in the cylinder is monitored in real time by the pressure sensor. After the first-stage main fuel injection, once the cylinder pressure in the cylinder has a downward trend, the second-stage main fuel injection is immediately executed to ensure that the cylinder pressure in the cylinder is maintained at the target pressure peak value.

For a method for controlling a combustion system with a single main fuel injection in the conventional technology, the single main fuel injection is a continuous and stable injection process, and liquid fuel oil continuously penetrates at a same rate. There is a rate difference between the liquid fuel oil and air, a shear force is at the outer edge of the contact between the liquid fuel oil and the air, and the shear force breaks and atomizes the liquid oil droplets. The entrainment effect generated by the single main fuel injection is single, and a high-strength area is at the forefront of an oil beam.

Figure 3:
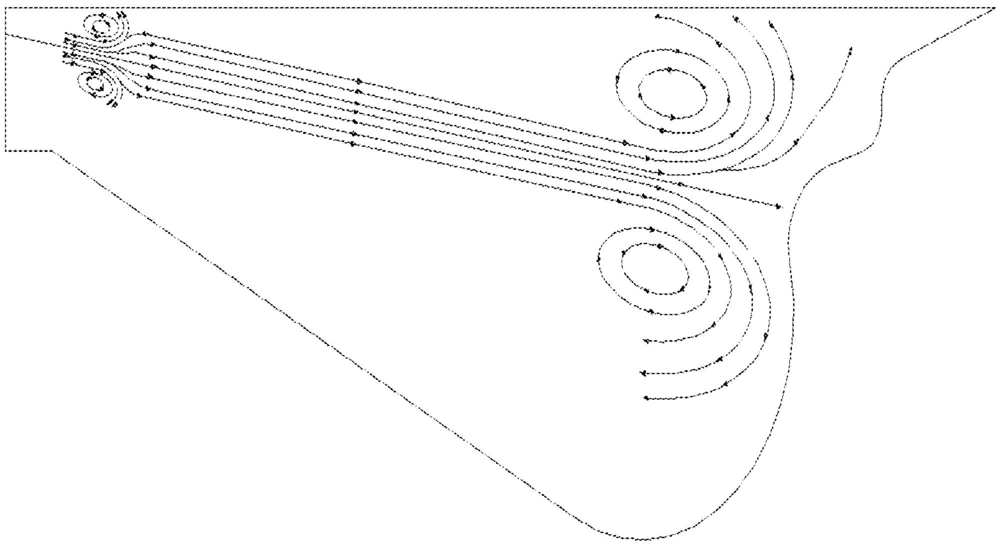
FIG. 3 is a simulation schematic diagram of an entrainment effect after the first-stage main fuel injection provided according to Embodiment 2 of the present application.
Figure 4:
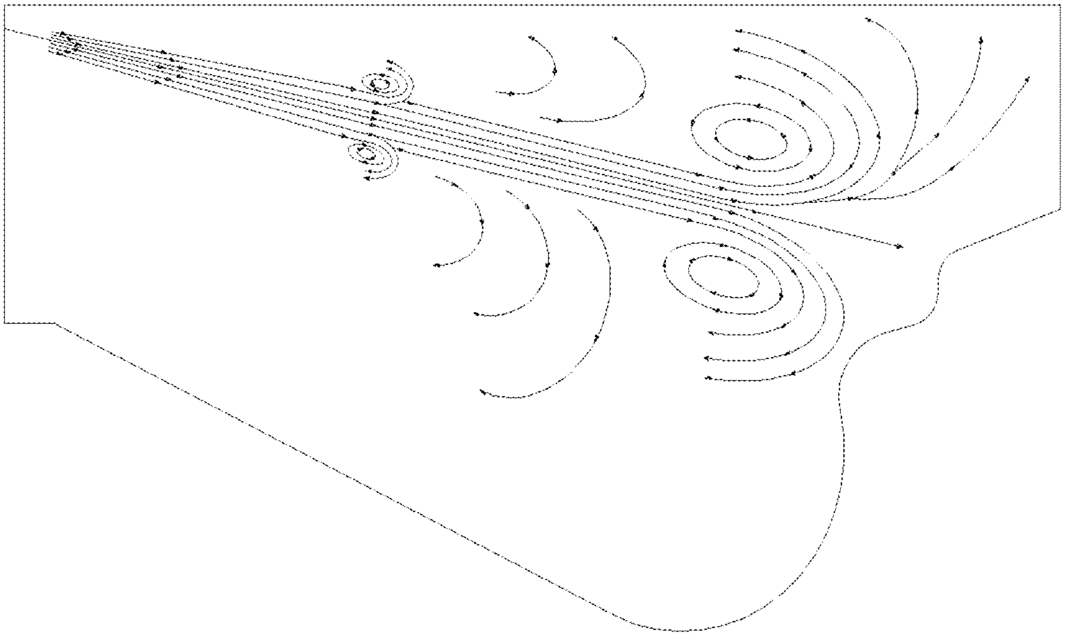
FIG. 4 is a simulation schematic diagram of an entrainment effect after the second-stage main fuel injection provided according to Embodiment 2 of the present application.

In the embodiment, as shown in FIGS. 3 and 4, during the injection process of the fuel oil, a main fuel injection process is divided into two processes, i.e., the first-stage main fuel injection and the second-stage main fuel injection. While a part of the fuel oil has already undergone a shear action, another part of the fuel oil continues to be injected and strengthen the shear action. The spatial superposition of the entrainment effect is generated at the outer edge of the junction of the oil beams, thereby maximizing the action on breaking and atomization of oil droplets.

For the two main fuel injections in the embodiment, the first-stage main fuel injection starts at the end of the compression stroke, the fuel is injected from a nozzle of the fuel injector into the combustion chamber at a relatively high speed, and the high-speed fuel oil beam produces strong turbulence kinetic energy. As the fuel of the second-stage main fuel injection is continuously injected, the entrainment area formed in the cylinder becomes larger and larger. During the first-stage main fuel injection, due to guide and diversion of the configuration of the piston, most of the fuel oil diffuses into the concavity of the w-type combustion chamber after the fuel hits the throat of the piston, a small part of the fuel oil flows towards the top of the piston, thereby generating a strong entrainment effect in the upper part of the combustion chamber space and the concavity, promoting rapid and uniform mixing of the fuel oil and the air. As the piston descends, a high-speed fuel jet of the second-stage main fuel injection is guided by multiple sections of arc ridges of the piston, thereby further promoting the superposition of entrainment effects, and further increasing the mixing area of the fuel oil and the air.

As a preferred embodiment of the method for controlling a combustion system, if a difference exists between the cylinder pressure in the cylinder during the first-stage main fuel injection and the target pressure peak value, a fuel rail pressure is adjusted and/or an interval time between the second-stage main fuel injection and the first-stage main fuel injection is adjusted so that the cylinder pressure in the cylinder is allowed to be equal to the target pressure peak value.

Specifically, in a case that the difference between the cylinder pressure in the cylinder during the first-stage main fuel injection and the target pressure peak value is less than or equal to 5%, the fuel rail pressure is adjusted to allow the cylinder pressure in the cylinder to reach the target pressure peak value. In a case that the difference between the cylinder pressure in the cylinder during the first-stage main fuel injection and the target pressure peak value is greater than 5%, the fuel rail pressure and the interval time between the second-stage main fuel injection and the first-stage main fuel injection are adjusted. In other embodiments, in a case that the difference between the cylinder pressure in the cylinder during the first-stage main fuel injection and the target pressure peak value is greater than 5%, only adjusting the interval time between the second-stage main fuel injection and the first-stage main fuel injection may be acceptable.

In the embodiment, when the fuel rail pressure is required to be adjusted, if the cylinder pressure in the cylinder is lower than the target pressure peak value after the first-stage main fuel injection, the fuel rail pressure is increased. If the cylinder pressure in the cylinder is higher than the target pressure peak value after the first-stage main fuel injection, the fuel rail pressure is reduced. When the interval time between the second-stage main fuel injection and the first-stage main fuel injection is required to be adjusted, if the cylinder pressure in the cylinder is lower than the target pressure peak value after the first-stage main fuel injection, the interval time between the second-stage main fuel injection and the first-stage main fuel injection is reduced. If the cylinder pressure in the cylinder is higher than the target pressure peak value after the first-stage main fuel injection, the interval time between the second-stage main fuel injection and the first-stage main fuel injection is extended.

As a preferred embodiment of the method for controlling a combustion system, a calibration parameter of a single main fuel injection is a parameter of the single main fuel injection calibrated when fuel consumption of the internal combustion engine is minimized, and nitrogen oxide emission of the internal combustion engine is minimized under a condition of meeting an emission requirement of nitrogen oxides. The calibration parameter of the single main fuel injection includes a calibration injection quantity of the single main fuel injection. The total fuel injection quantity for the first-stage main fuel injection and the second-stage main fuel injection is equal to the calibrated fuel injection quantity for a single main fuel injection. Assuming that an injection quantity of the first-stage main fuel injection is Q1, and an injection quantity of the second-stage main fuel injection is Q2, Q2 is equal to 0.05Q1 to 0.5Q1.

In the embodiment, the controller stores the calibration parameter of the single main fuel injection. The calibration injection quantity of the single main fuel injection is acquired under a condition of meeting an optimal injection strategy when the method for controlling a combustion system is the single main fuel injection. The optimal injection strategy refers to minimizing the fuel consumption and the nitrogen oxide emission of the internal combustion engine under the condition of meeting the emission requirement of nitrogen oxides.

As a preferred embodiment of the method for controlling a combustion system, a duration of the first-stage main fuel injection is determined according to the injection quantity of the first-stage main fuel injection and an injection pressure of the first-stage main fuel injection, and a duration of the second-stage main fuel injection is determined according to the injection quantity of the second-stage main fuel injection and an injection pressure of the second-stage main fuel injection.

As a preferred embodiment of the method for controlling a combustion system, the calibration parameter of the single main fuel injection further includes a calibration injection pressure of the single main fuel injection. The injection pressure of the first-stage main fuel injection is greater than the calibration injection pressure of a single main fuel injection, and the injection pressure of the second-stage main fuel injection is greater than or equal to the injection pressure of the first-stage main fuel injection. In the embodiment, the maximum injection pressure of the combustion system is usually 1600 bar to 2500 bar. The calibration injection pressure of the single main fuel injection, the injection pressure of the first-stage main fuel injection, and the injection pressure of the second-stage main fuel injection cannot exceed the maximum injection pressure of the combustion system. The calibration injection pressure of the single main fuel injection is acquired by those skilled in the art under the condition of meeting the optimal injection strategy when the method for controlling a combustion system is the single main fuel injection. The injection pressure of the first-stage main fuel injection is set according to the acquired calibration injection pressure of the single main fuel injection, and then the injection pressure of the second-stage main fuel injection is set according to the injection pressure of the first-stage main fuel injection. The injection pressure of the second-stage main fuel injection is greater than or equal to the injection pressure of the first-stage main fuel injection, so that the injection rate of the fuel in the second-stage main fuel injection is greater than or equal to the injection rate of the fuel in the first-stage main fuel injection, thereby accelerating the momentum exchange between the fuel injected in the second-stage main fuel injection and the fuel injected in the first-stage main fuel injection, and increasing the superposition of entrainment effects.

As a preferred embodiment of the method for controlling a combustion system, the duration of the first-stage main fuel injection and the duration of the second-stage main fuel injection are both within a range of 100 μs to 1500 μs.

As a preferred embodiment of the method for controlling a combustion system, the duration of the first-stage main fuel injection is within a range from the crank angle of 25° before the top dead center to the crank angle of 20° after the top dead center.

As a preferred embodiment of the method for controlling a combustion system, the predetermined time is 50% to 100% of the duration of the first-stage main fuel injection. In the embodiment, the first-stage main fuel injection is mainly used to establish the target pressure peak value in the cylinder. The second-stage main fuel injection can further enhance the oil air mixture in the cylinder, and through the second-stage main fuel injection, the mixing area is increased, and the air utilization rate in the cylinder is improved, thereby the combustion speed in the cylinder in the middle and later stages is improved and the rapid combustion of fuel is promoted, so that the heat release rate of the entire combustion process is at a high value, the cylinder pressure of the cylinder is maintained at the target pressure peak value for a certain period of time, thus, the combustion is relatively sufficient, doing work is increased, and the fuel consumption is minimal. It is understandable that the fuel consumption is equal to the ratio of injection quantity to power of doing work. Assuming that the injection quantity is constant, the more the work is done, the lower the fuel consumption is. The more sufficiently the fuel is burned in the combustion system, the more work is done, and the lower the fuel consumption is.

The method for controlling a combustion system provided according to the embodiment involves controlling the fuel injector to execute the first-stage main fuel injection in the compression stroke. The first-stage main fuel injection includes at least one injection and lasts until the power stroke, so that the cylinder pressure in the cylinder reaches the target pressure peak value. The second-stage main fuel injection is executed before the cylinder pressure in the cylinder reaches the descending critical point. The second-stage main fuel injection includes at least one injection, the fuel injected in the second-stage main fuel injection the fuel injected in the first-stage main fuel injection are superimposed, so that the cylinder pressure in the cylinder is maintained at the target pressure peak value for the predetermined time. The method for controlling a combustion system provided according to the embodiment establishes the target pressure peak value in the cylinder through the first-stage main fuel injection. The second-stage main fuel injection is executed when the cylinder pressure in the cylinder is at the descending critical point, which can promote the superposition of the entrainment effects, further increase the mixing area of fuel and air, and improve the air utilization rate in the cylinder, thereby improving the combustion speed in the cylinder in the middle and later stages and promoting rapid combustion of the fuel, always maintaining the heat release at a high level value during the combustion process and maintaining a constant pressure in the cylinder.

The above is only preferred embodiments of the present application. For those skilled in the art, changes may be in the specific implementations and application scopes based on the ideas of the present application. The description should not be understood as limitations of the present application.

The invention claimed is:

1. A method for controlling a combustion system, wherein the combustion system comprises a piston, a fuel injector and a cylinder, the fuel injector injects a main fuel into the cylinder in succession in a main fuel injection stage to drive the piston to work, and the method for controlling a combustion system comprises:

controlling the fuel injector to execute a first-stage main fuel injection in a compression stroke to allow a cylinder pressure in the cylinder to reach a target pressure peak value, wherein the first-stage main fuel injection comprises at least one injection and lasts to a power stroke; and execute a second-stage main fuel injection before the cylinder pressure in the cylinder is at a descending critical point to allow the cylinder pressure in the cylinder to be maintained at the target pressure peak value for a predetermined time, wherein the second-stage main fuel injection comprises at least one injection, and fuel injected in the second-stage main fuel injection and fuel injected in the first-stage main fuel injection are superimposed;

wherein a calibration parameter of a single main fuel injection is a parameter of the single main fuel injection calibrated when fuel consumption of an internal combustion engine is minimized and nitrogen oxide emission of the internal combustion engine is minimized under a condition of meeting an emission requirement of nitrogen oxides, the calibration parameter of the single main fuel injection comprises a calibration injection quantity of the single main fuel injection, and total injection quantity of the first-stage main fuel injection and the second-stage main fuel injection is equal to the calibration injection quantity of the single main fuel injection;

wherein an injection quantity of the first-stage main fuel injection is Q1, an injection quantity of the second-stage main fuel injection is Q2, and Q2 is equal to 0.05Q1 to 0.5Q1;

wherein a duration of the first-stage main fuel injection is determined according to the injection quantity of the first-stage main fuel injection and an injection pressure of the first-stage main fuel injection, and a duration of the second-stage main fuel injection is determined according to the injection quantity of the second-stage main fuel injection and an injection pressure of the second-stage main fuel injection;

wherein the calibration parameter of the single main fuel injection further comprises a calibration injection pressure of the single main fuel injection, the injection pressure of the first-stage main fuel injection is greater than the calibration injection pressure of the single main fuel injection, and the injection pressure of the second-stage main fuel injection is greater than or equal to the injection pressure of the first-stage main fuel injection.

2. The method for controlling a combustion system according to claim 1, wherein in a case that a difference presents between the cylinder pressure in the cylinder during the first-stage main fuel injection and the target pressure peak value, a fuel rail pressure is adjusted and/or an interval time between the second-stage main fuel injection and the first-stage main fuel injection is adjusted to allow the cylinder pressure in the cylinder to be equal to the target pressure peak value.

3. The method for controlling a combustion system according to claim 2, wherein in a case that the difference between the cylinder pressure in the cylinder during the first-stage main fuel injection and the target pressure peak value is less than or equal to 5%, the fuel rail pressure is adjusted to allow the cylinder pressure in the cylinder to reach the target pressure peak value;

in a case that the difference between the cylinder pressure in the cylinder during the first-stage main fuel injection and the target pressure peak value is greater than 5%, the fuel rail pressure is adjusted and the interval time between the second-stage main fuel injection and the first-stage main fuel injection is adjusted to allow the cylinder pressure in the cylinder to reach the target pressure peak value, or the interval time between the second-stage main fuel injection and the first-stage main fuel injection is adjusted to allow the cylinder pressure in the cylinder to reach the target pressure peak value.

4. The method for controlling a combustion system according to claim 2, wherein the interval time between the second-stage main fuel injection and the first-stage main fuel injection is 300μs to 1200 μs.

5. The method for controlling a combustion system according to claim 1, wherein a duration of the first-stage main fuel injection is determined according to the injection quantity of the first-stage main fuel injection and an injection pressure of the first-stage main fuel injection, and a duration of the second-stage main fuel injection is determined according to the injection quantity of the second-stage main fuel injection and an injection pressure of the second-stage main fuel injection.

6. The method for controlling a combustion system according to claim 5, wherein the calibration parameter of the single main fuel injection further comprises a calibration injection pressure of the single main fuel injection, the injection pressure of the first-stage main fuel injection is greater than the calibration injection pressure of the single main fuel injection, and the injection pressure of the second-stage main fuel injection is greater than or equal to the injection pressure of the first-stage main fuel injection.

7. The method for controlling a combustion system according to claim 1, wherein the duration of the first-stage main fuel injection and the duration of the second-stage main fuel injection are both within a range of 100 μs to 1500 μs.

8. The method for controlling a combustion system according to claim 7, wherein the duration of the first-stage main fuel injection is within a range from a crank angle of 25° before a top dead center to the crank angle of 20° after a top dead center.

9. The method for controlling a combustion system according to claim 8, wherein the predetermined time is 50% to 100% of the duration of the first-stage main fuel injection.

10. A combustion system, using the method for controlling the combustion system according to claim 1, wherein a pressure sensor is arranged in the cylinder, and the pressure sensor is configured to detect the cylinder pressure in the cylinder.

11. An internal combustion engine, comprising the combustion system according to claim 10.

* * * * *